Inventors
G.T.R. CAMPBELL
N.V. LASKEY

Attorneys

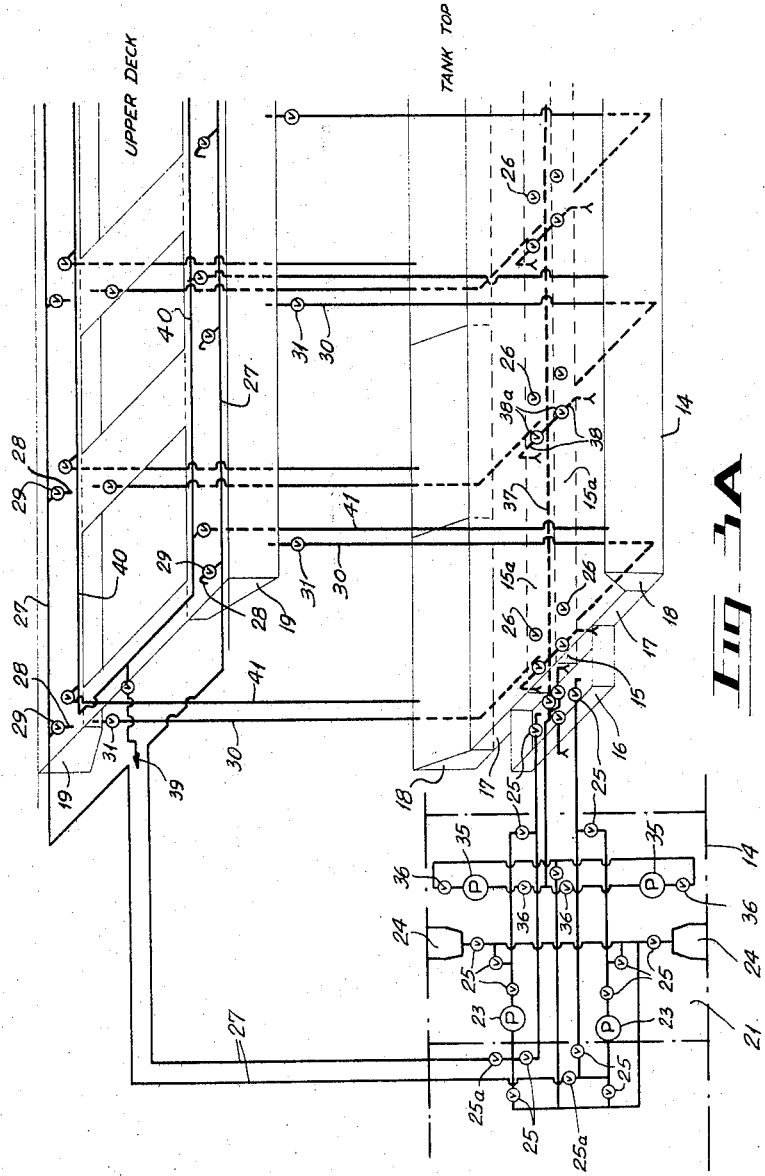

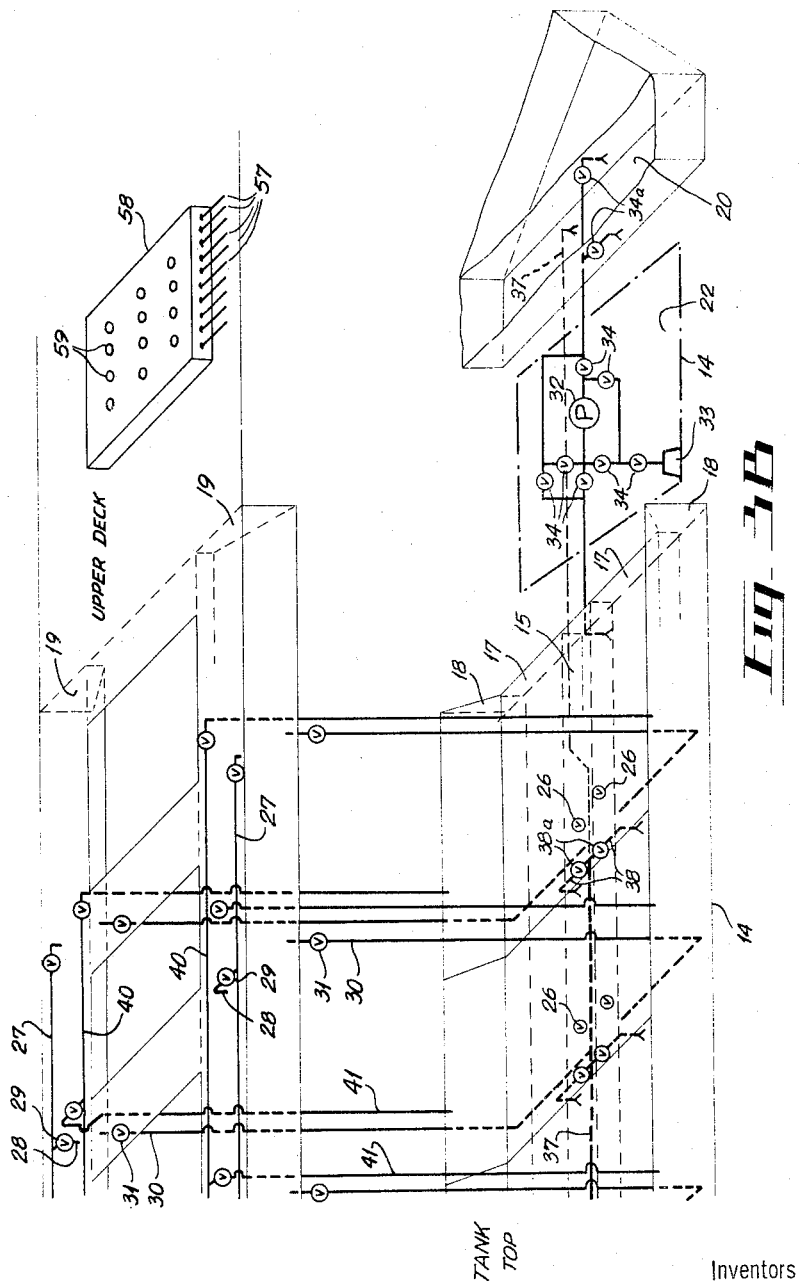

Oct. 5, 1965   G. T. R. CAMPBELL ETAL   3,209,715
BILGE, BALLASTING, DEBALLASTING AND CARGO OIL PUMPING SYSTEM
Filed May 23, 1963   12 Sheets-Sheet 4

Inventors
G.T.R. CAMPBELL
N.V. LASKEY

Fetherstonhaugh & Co.
Attorneys

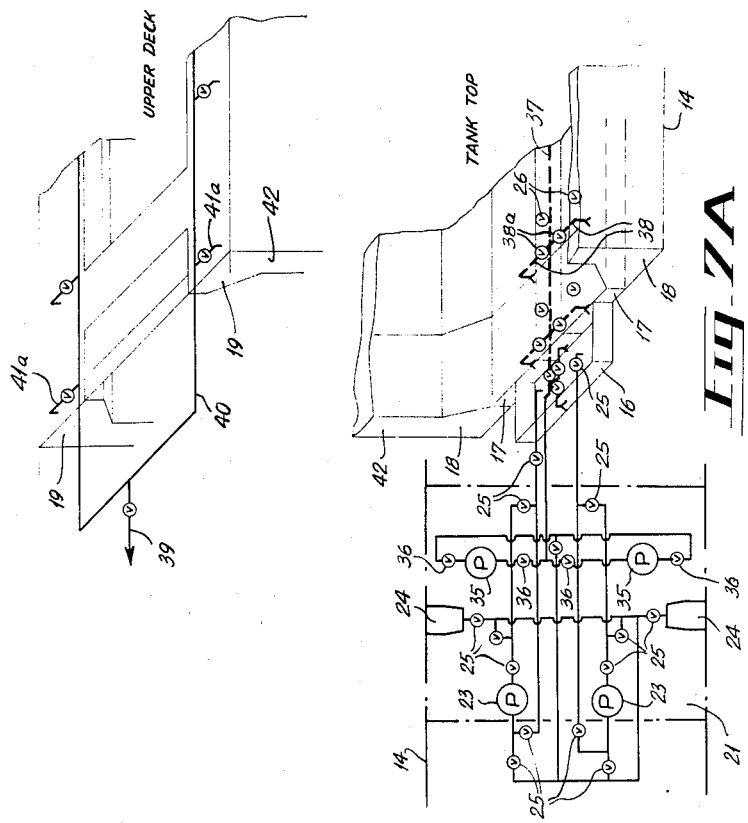

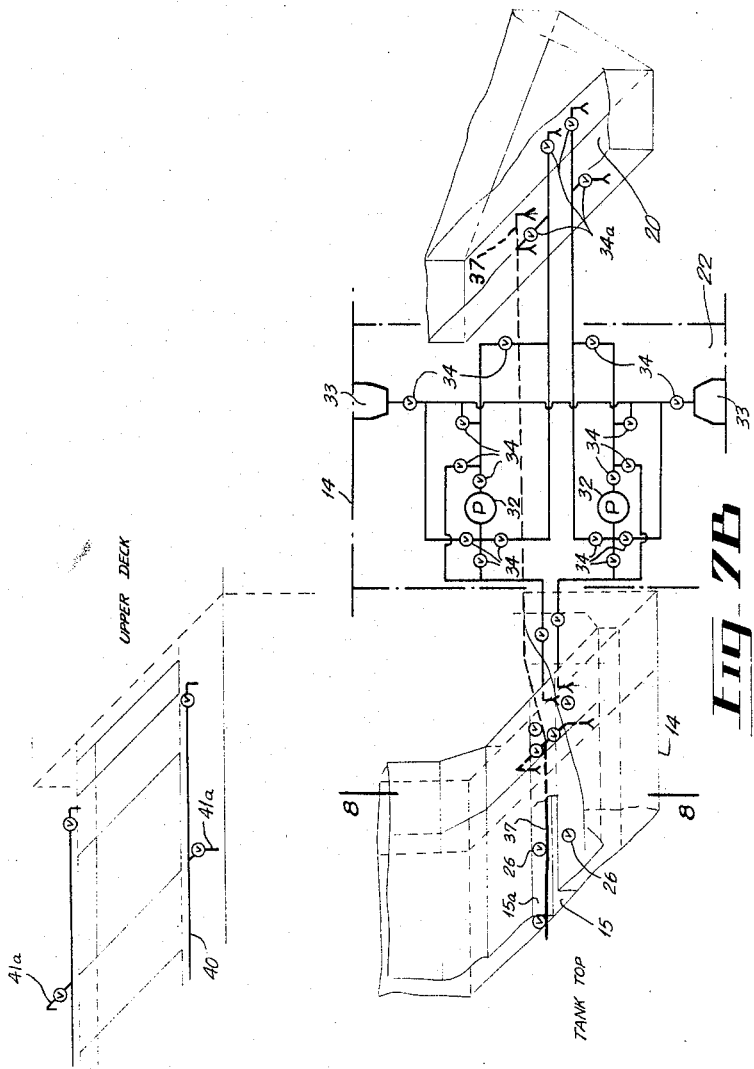

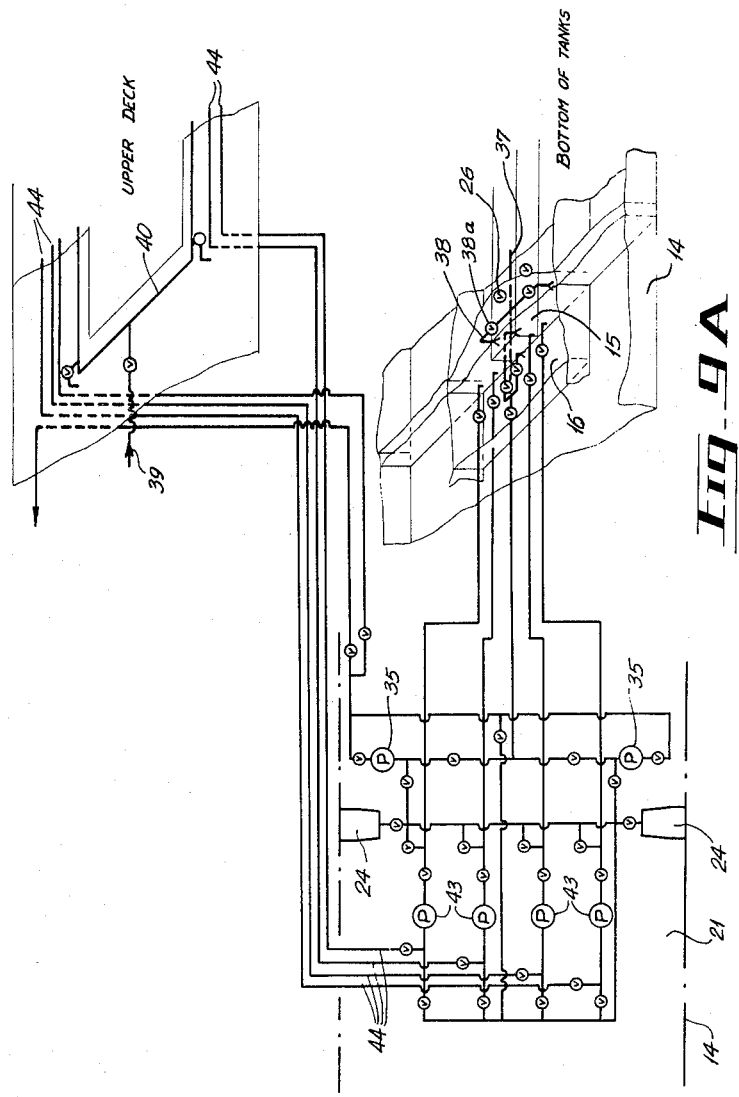

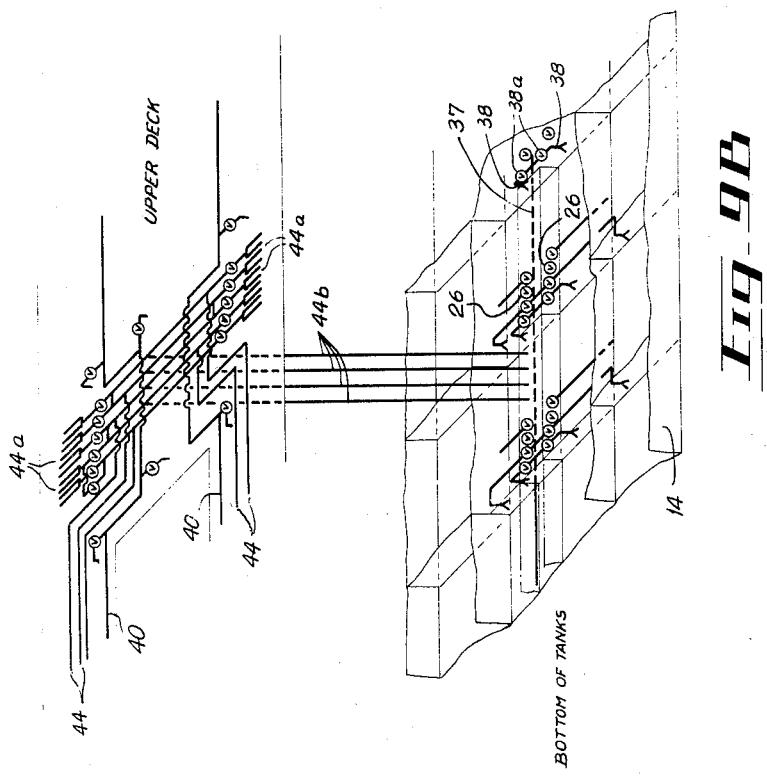

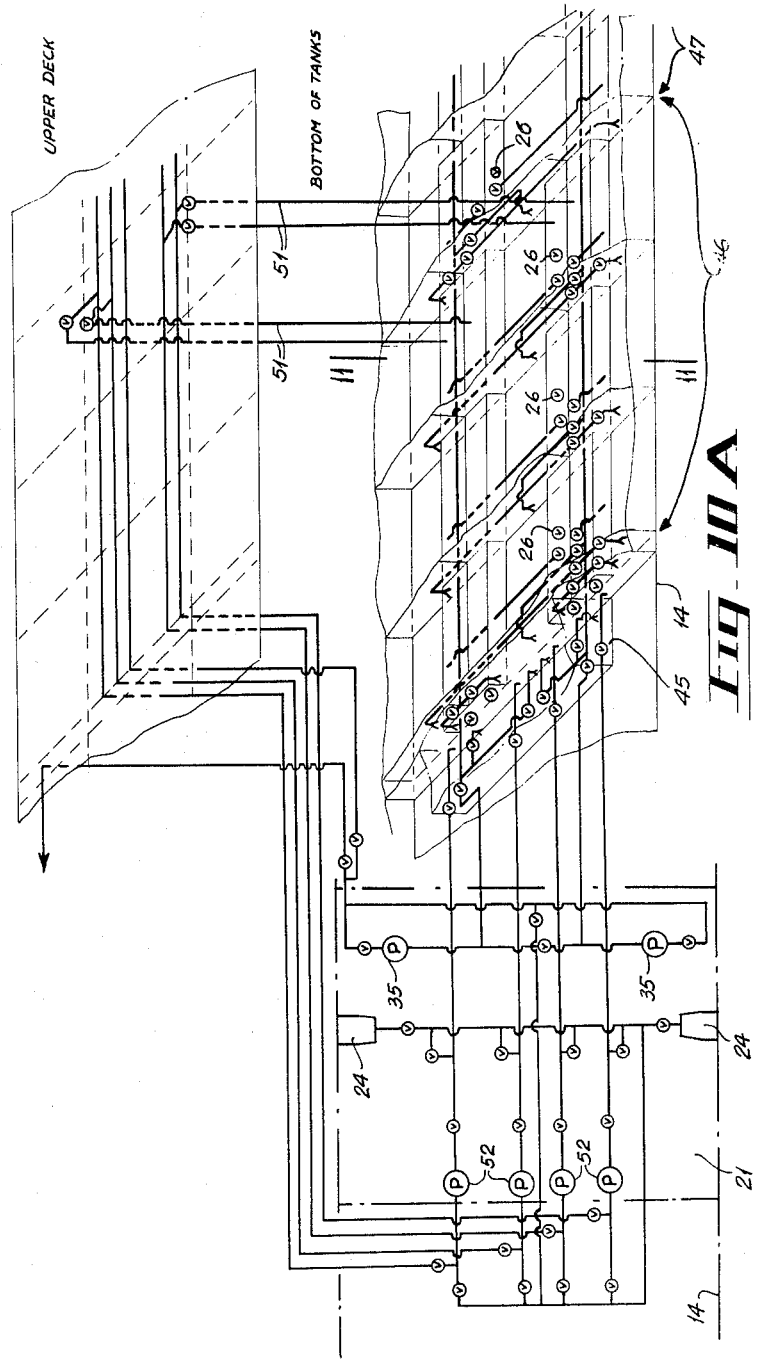

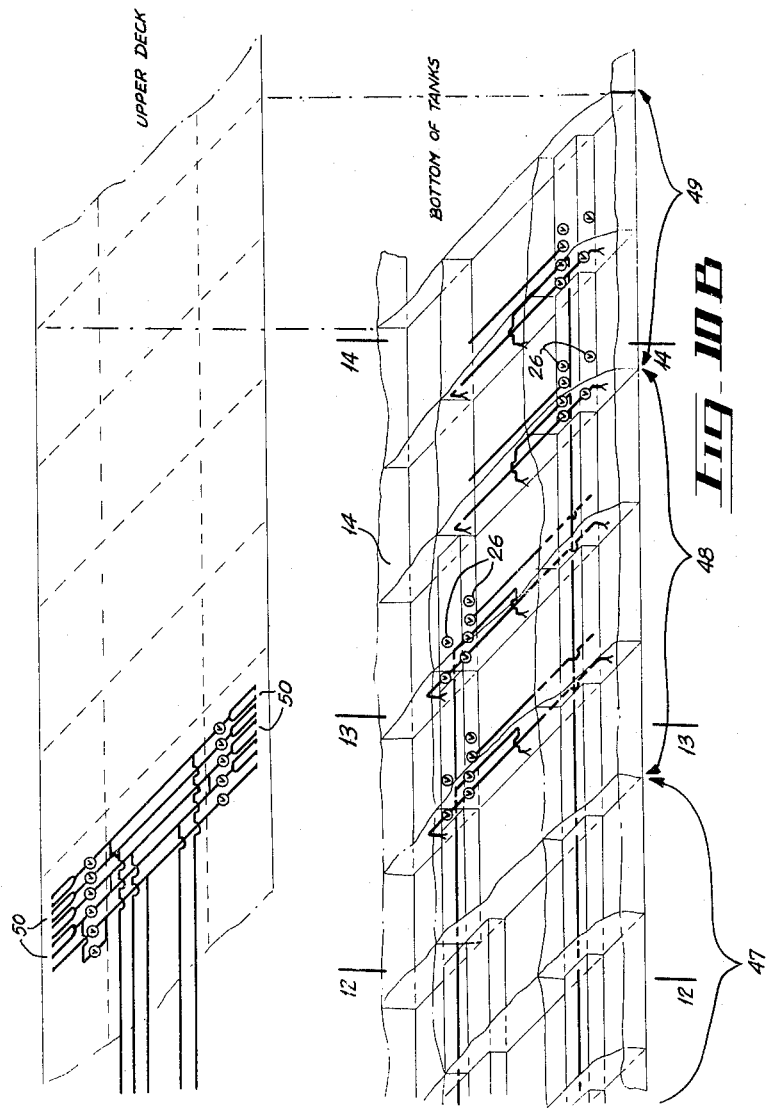

Inventors
G.T.R. CAMPBELL
N.V. LASKEY

United States Patent Office 3,209,715
Patented Oct. 5, 1965

3,209,715
BILGE, BALLASTING, DEBALLASTING AND CARGO OIL PUMPING SYSTEM
George T. R. Campbell, Montreal, Quebec, and Norman V. Laskey, St. Lambert, Quebec, Canada, assignors to Algonquin Shipping and Trading Limited, Montreal, Quebec, Canada
Filed May 23, 1963, Ser. No. 282,665
Claims priority, application Canada, June 1, 1962, 850,592
3 Claims. (Cl. 114—74)

This invention relates to combined ballast and cargo pumping systems for vessels and particularly to a pumping system which will enable ballasting and deballasting of a vessel to be carried out at least as fast as the loading and unloading of a vessel cargo, whereby the trim of the vessel can be maintained at a level which will be most advantageous relative to dock-side loading and unloading facilities.

With the continuing trend towards larger solid and liquid bulk cargo carrying vessels, the loading and unloading of bulk oil cargos, as well as the ballasting and deballasting of dry cargo vessels has necessitated the use of a complicated system of large bore suction and discharge pipes in association with cargo and ballast pumps having a discharge capacity in the region of 1500–3000 tons per hour. Piping systems to accommodate such large capacities are expensive to install, difficult to maintain and the weight, which is quite appreciable, reduces the dead weight capabilities of the vessel.

Besides these disadvantages, there is a definite limitation on the maximum amount of cargo oil or water ballast which can be handled by a pumping system which employs long and tortuous runs of piping to convey fluid to be pumped, to the suction eye of the pump. The reason for this is that there is a physical and commercial limit with regard to the diameter of the suction piping which can be installed within the cargo oil tanks or water ballast tanks of a ship.

When the run of piping is excessive, and particularly when there are a number of bends in the lines, the friction loss in the suction piping reduces the total discharge capacity of the pumps owing to the increase in the suction lift.

In order to combat the high cost and installation difficulties which arise when installing cargo oil or ballast piping, it has been known to form a duct keel in vessels in which all the fore and aft runs of suction piping are installed, from whence they are branched to the individual double bottom tanks or port and starboard side tanks of the vessel. However, the high friction loss in the suction piping still exists and as a consequence, the discharge capabilities of the cargo or ballast pumps are considerably reduced.

In addition to the trouble encountered with the piping and pumps, there is a further difficulty encountered in that certain port facilities are capable of loading and unloading cargo at such a high rate that ship installed ballast pumps and piping cannot maintain the vessel in a satisfactory trim to suit, to best advantage, the height location of dock loading and unloading equipment and depth of water at dock-side.

The present invention seeks to overcome the above disadvantages and consists essentially in the provision of a longitudinal trunk or trunks preferably built into the double bottom of vessels or in the bottom of the holds of the vessel where there is no double bottom. The trunking preferably extends the full length of the cargo carrying portions of the vessel and preferably terminates in a transverse trunk or trunks adjacent or under forward and after pump rooms of the vessel. In cases where a single pump is installed at the forward or after end of the vessel, the pump can be connected directly to the longitudinal trunk without any intervening length of piping. Suitable transverse branch connections are made between the longitudinal trunk and each section of the port and starboard double bottom, and to port and starboard wing ballast tanks. Suitable control valves are installed at each branch connection from the longitudinal trunks by which the ballasting and deballasting can be controlled, preferably from a central control panel at some suitable location on the vessel. Where the double bottom compartments adjoin the longitudinal trunk, the control valves can be installed directly on the separating wall.

Pumps located in the vessel's pump rooms are connected on one side either directly with the longitudinal trunking but are preferably connected to transverse trunking at the ends of the longitudinal trunking, and can also be connected with the fore and aft peaks of the vessel if desired. The other side of the pumps are connected with sea suction chests on the side of the vessel. For the purpose of ballasting or filling the cellular double bottom tanks of the vessel it is only necessary to operate the ballast pump or pumps in a manner whereby they draw collectively or individually from the sea suction chests and discharge directly into the transverse trunk and connected longitudinal trunking. It is then only necessary to open the valve communicating with the appropriate double bottom tank or ballast tank in order to fill the tank with ballast water. Upper wing tanks can be filled from wash-deck mains and these same tanks can be drained directly to the longitudinal trunks.

In order to deballast the vessel, the valves in the longitudinal trunking communicating with the ballast tanks are opened, thereby allowing the contents to discharge into the trunking. The ballast pump or pumps are then operated in a manner whereby they draw from the transverse trunk and connected longitudinal trunking and discharge directly through the sea suction chests.

As the main ballast pumps will not completely drain the ballast tanks, a separate stripping or tank draining system including a stripping pump is installed in the vessel, with a stripping main from the pump being located in the longitudinal trunk. Also, suitable valved branch connections connect the stripping main with the individual ballast tanks so that individual tanks can be emptied independently of the flooded longitudinal trunk.

A compressed air circuit has branches leading to all ballast tanks and works in conjunction with the stripping installation for the purpose of effectively emptying the ballast tanks.

Where the system is employed in oil cargo vessels, the cargo can be loaded or discharged via the longitudinal trunking, in association with the cargo loading and discharge station on the main deck. Therefore, the only drop lines from the loading and discharge station on deck are connected to the longitudinal trunking and the entire network of suction pipes usually arranged in the oil cargo tanks can be dispensed with completely.

The object of the invention therefore is to facilitate the ballasting and deballasting of a vessel in the shortest possible time and with a minimum of piping.

A further object of the invention is to provide means whereby ballasting and deballasting of a vessel can be used to maintain the vessel in trim under maximum loading and unloading conditions.

A further object of the invention is to provide means whereby with a minimum of pump capacity the ballasting and deballasting can be maintained at a rate equal to the loading and unloading of cargo.

A further object of the invention is to reduce to a minimum the total amount and size of piping extending throughout a vessel and particularly in cargo holds and tanks.

A further object of the invention is to provide means whereby a vessel's ballast pumps have a minimum length of piping on one side to the vessel's sea suction chests and on the other side to a common trunk from which all ballast trunks are served.

A further object of the invention is to provide a common fore and aft fluid reservoir directly connected with the deck loading and unloading facilities and having controlled branch connections to individual cargo holds.

A further object of the invention is to provide means whereby ballast distribution to and from a common fore and aft trunking can be controlled from a centrally located control panel.

These and other objects of the invention will be apparent from the following detailed description and the accompanying drawings, in which:

FIGS. 3A and 3B are respectively aft and fore schematic views of a ballast pumping system according to the present invention as applied to bulk cargo vessels.

FIGS. 7A and 7B are respectively aft and fore partial schematic views similar to FIGS. 3A and 3B, but showing the pumping system applied to ballasting deballasting of a bulk cargo vessel.

FIGS. 9A and 9B are respectively aft and mid-position partial schematic views similar to FIGS. 3A and 3B, but showing the pumping system applied to an ore or oil bulk carrier vessel.

FIGS. 10A and 10B are respectively aft and mid-position partial schematic views similar to FIGS. 9A and 9B, but showing the pumping system applied to a large vessel using two longitudinal ballast reservoir trunks extending from a common transverse trunk.

Figure 1:
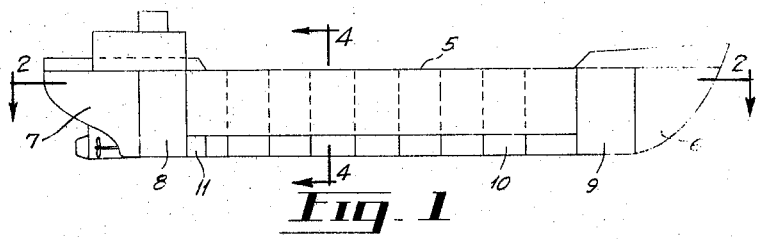
FIG. 1 is a longitudinal sectional outline of a vessel showing the location of the transverse and longitudinal ballast reservoir trunking.
Figure 2:
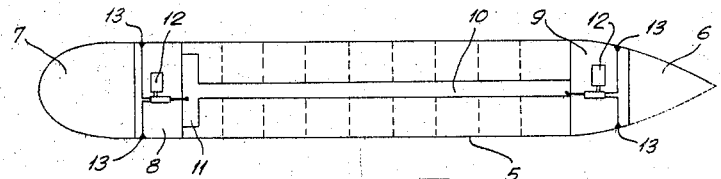
FIG. 2 is a plan view on the line 2—2 of FIG. 1.

In FIGS. 1 and 2 of the drawings, the vessel 5 is provided with fore and aft peak tanks 6 and 7 respectively and with either an aft pump room 8 or a fore pump room 9, or may be provided with both fore and aft pump rooms depending on the specific requirements of the vessel. The vessel 5 is also provided with a longitudinal trunk 10 extending the length of the vessel terminating at one or both ends in a transverse trunk 11.

The pumps 12 in the pump rooms 8 and 9 are connected on one side with the sea suction chests 13 and on the other side with the transverse trunk 11.

By this arrangement the transverse trunk 11 and the longitudinal trunk 10 can be kept flooded as a reservoir from which all double bottom and wing ballast tanks can be filled, with control valves controlling the flow from the trunk 10 and operable from any suitable central location.

The above is an outline of the basic concept of the invention. The following detailed descriptions apply to various forms of installations required to meet specific types of vessels and the cargo carried by them. It is to be understood that the various installations show piping arrangements which can be modified to a considerable extent within the scope of the present invention.

Figure 4:
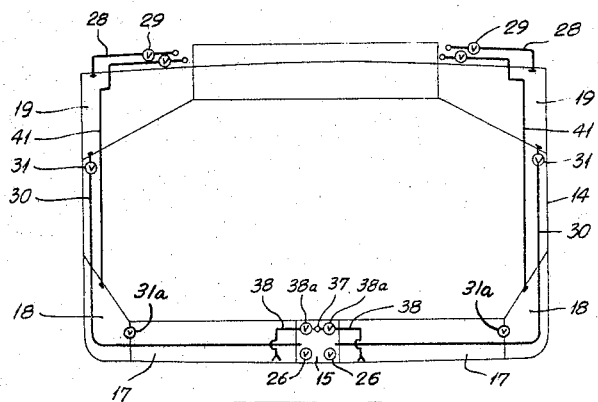
FIG. 4 is a transverse section of a vessel generally on the line 4—4 of FIG. 1.

In FIGS. 3A, 3B and 4 there is shown a schematic layout of a piping system applied to a vessel 14 suitable for carrying bulk dry cargo. This vessel 14 has a longitudinal trunk 15 and has aft transverse trunk 16 freely communicating with the trunk 15. The vessel 14 also is provided with double bottom compartments 17 and connected side hopper tanks 18, wing ballast tanks 19 and a fore peak tank 20. The hopper tanks 18 and wing ballast tanks are connected with the trunk 15 via the tanks 17 by means of the valves 31 and 31a. There is also provided an aft pump room 21 and a forward pump room 22.

The ballast pumps 23 in the aft pump room 21 are connected on one side with the port and starboard sea suction chests 24 through a system of cross-over pipes and are connected on the other side with the transverse trunk 16 and the freely connected longitudinal trunk 15. This latter side of the pumps 23 is also connected together by a system of cross-over pipes and are also connected by piping with the wing ballast tanks 19. All connections between port and starboard sea suction chests 24, between port and starboard pumps 23, between adjacent pumps and sea suction chests, and between the pumps and the wing ballast tanks 19, are fitted with isolating valves 25 controlled from a convenient central location.

Valves 26 located on the side walls 15a of the longitudinal trunk 15, control the flow of ballast water from the trunk 15 to the individual double bottom compartments 17 and connected side hopper tanks 18. These valves 26 are also controlled from a convenient central location.

The pipe connections 27 leading from the pumps 23 to the wing ballast tanks 19 have valved branches 28 to each individual wing tank 19. The valves 29 being controlled also from a convenient central location. Each wing tank is provided with a drain pipe 30 and a valve 31, the drain pipes being directed downwards through the side hopper tanks 18 and double bottom compartments 17 and into the longitudinal trunk 15.

At the forward end of the vessel 14, the pump 32 in the forward pump room 22, is connected on one side with the sea suction chest 33 and with the fore peak tank 20, and on the other side with the forward end of the longitudinal trunk 15. Suitable cross connections between either side of the pump 32 and the sea suction chest 33 are provided with control valves 34, all of which are operated from a central control station.

By means of the above described system any one of the pumps 23 and 32 can be operated either singly or in any selected combination to keep the transverse trunk 16 and the longitudinal trunk 15 full of ballast water, and by means of selectively opening and closing the valves 26 any combination of double bottom compartments and side hopper tanks 18 can be filled with ballast water direct from the trunk 15 and without the use of heavy and expensive distribution pipes. Similarly, the wing ballast tanks can be selectively filled by water pumped through the lines 27 from the pumps 23.

In deballasting, the ballast pumps will remove all but a few inches of water remaining in the bottom of the tanks. This is because large capacity ballast pumps will not effectively handle the remaining small quantity of water. Also, a very small submergence of the suction pipe connection to the large ballast pump, would cause the pump to operate under heavy cavitation conditions and lead to premature failure of the pump impeller. It is therefore desirable to expel the small quantity of water remaining in the tanks by means other than the large capacity ballast pumps. This is accomplished by means of the stripping pumps 35 located, port and starboard in the pump room 21. Pumps 35 are preferably low capacity, reciprocating, positive displacement type and are interconnected on both sides with suitable control valves 36 being fitted in the connections. The pumps 35 are connected on one side with a main stripping line 37 extending through the full length of the trunk 15. Branch suction pipes 38 from the line 37 connect with each of the double bottom compartments 17 and interconnected side hopper tanks 18 via the valve 31a. Each suction pipe 38 is provided with a control valve 38a. As each of the wing ballast tanks 19 has its own valve controlled drain pipe 30 leading down to the side hopper tanks 18, all ballast tanks and fore peak 20 can be drained through the main stripper line 37 by means of the pumps 35.

On dry cargo vessels, the flow of ballast water to the trunk during deballasting can be speeded-up by introducing low pressure compressed air from the compressed air main connection 39 on the main deck. Connection 39 supplies compressed air to port and starboard lines 40 and branch connection lines 41 connect lines 40 with each of the separate side hopper tanks 18.

With the above arrangement, the vessel has a built-in self salvaging feature. Should the bottom become holed after a grounding, leakage of water into the tank can be prevented by applying compressed air to the particular tank, through the branch lines provided.

Figure 8:
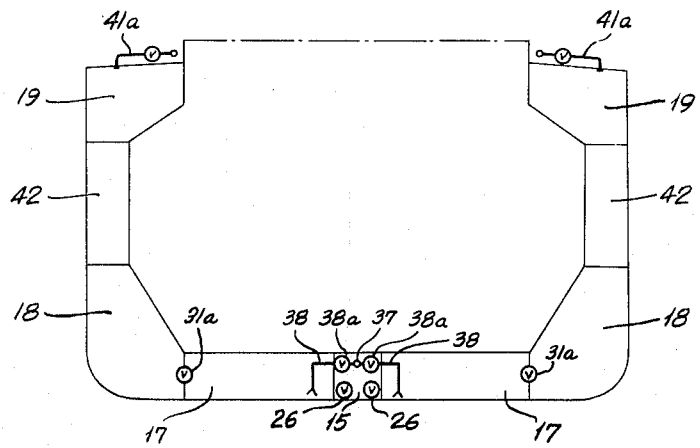
FIG. 8 is a transverse section of a vessel generally on the line 8—8 of FIG. 7B.
Figure 14:
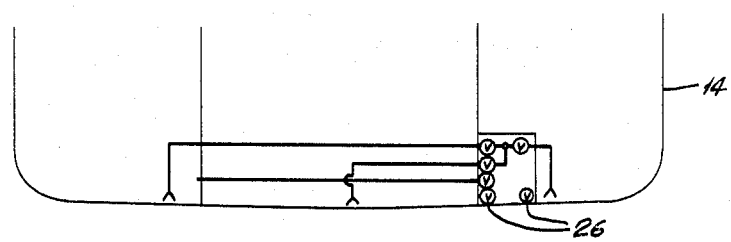
FIG. 14 is a transverse section taken on the line 14—14 of FIG. 10B.
Figure 13:
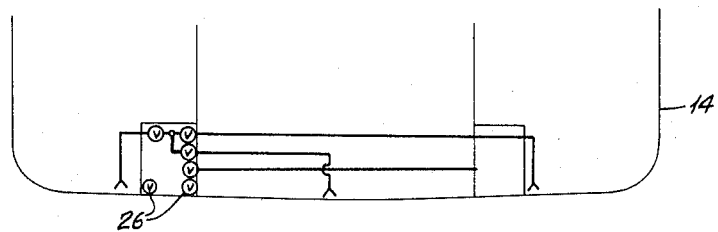
FIG. 13 is a transverse section taken on the line 13—13 of FIG. 10B.
Figure 12:
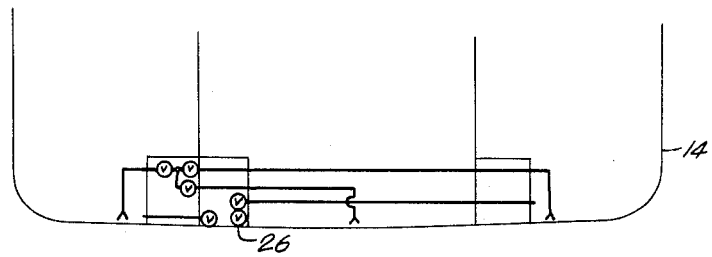
FIG. 12 is a transverse section taken on the line 12—12 of FIG. 10B.
Figure 11:
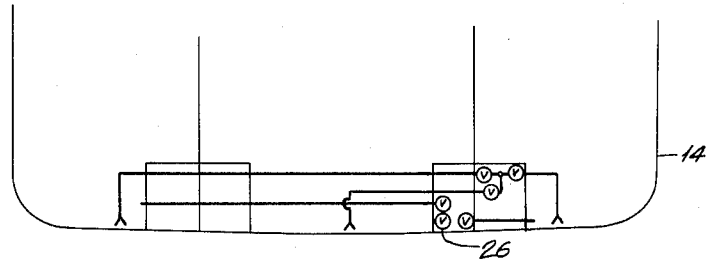
FIG. 11 is a transverse section taken on the line 11—11 of FIG. 10A.

In FIGS. 7A, 7B and 8 the upper wing tanks 19, side tanks 42 and side hopper tanks 18 are all interconnected with each other and with the double bottom compartments 17. In this arrangement the drain pipes 30 of FIGS. 3A and 3B are eliminated, and the compressed air branches 41a only extend into the upper wing tanks 19.

In FIGS. 9A and 9B the invention is shown applied to a bulk cargo (ore or oil) vessel. In this system a series of cargo oil pumps 43 are connected on one side with the transverse trunk 16 and longitudinal trunk 15 in the manner described above. On the other side, the pumps 43 are connected through lines 44 with the deck loading and discharge lines 44a. Cargo oil taken on board at the lines 44a can flow directly through the lines 44b into the longitudinal trunk 15. Suitable control valves 26 in the side walls 15a of the trunk 15 control the distribution of cargo oil to the ship's tanks in the same manner as described above in connection with FIGS. 3A and 3B.

In FIGS. 10A and 10B there is shown a modification of the system shown in FIGS. 9A and 9B. In this modified system there is shown a single transverse trunk 45 making connection with a series of longitudinal trunks. Adjacent the transverse trunk there are four longitudinal trunks 46, further forward this is reduced to three trunks 47, still further forward there are only two trunks 48, and ultimately this tapers off to a single trunk 49. This system of longitudinal trunks all interconnected with each other and the transverse trunk 15 is specially suitable for very large oil cargo vessels and eliminates a large maze of piping connecting the various holds with the deck loading and discharge pipes and with the oil cargo pumps.

Oil received at the deck connections 50 is permitted to flow down the pipe connections 51 directly into the four longitudinal trunks 46 from whence it is free to flow into the trunks 47, 48 and 49. From these separate trunks the oil is selectively admitted to the oil cargo tanks by means of the control valves 26 as above described.

The oil cargo pumps 52 are all connected on one side with the transverse trunk 45 and on the other side with the deck loading and discharge connections 50.

FIGS. 11, 12, 13 and 14 are transverse sections of the vessel showing more clearly the arrangement of the longitudinal trunks in the system shown in FIGS. 10A and 10B.

Figure 15:
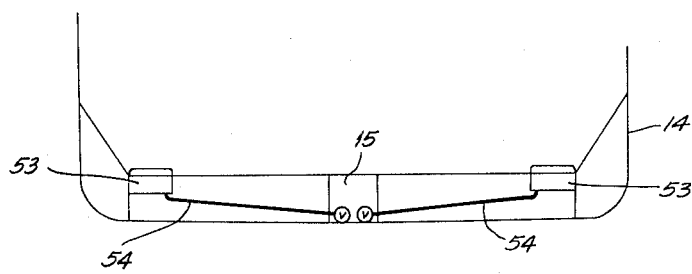
FIG. 15 is a transverse section showing a typical bilge drain from the hold of a vessel leading into the longitudinal trunk.

In FIG. 15 there is shown port and starboard bilge strum boxes 53 with connections 54 leading to the longitudinal trunk 15, whereby the holds of the vessel are drained. This arrangement of hold strum boxes draining to the longitudinal trunk of the vessel is typical of all the systems shown and eliminates the many pipe connections from each hold to centralized bilge pumps.

Figure 5:
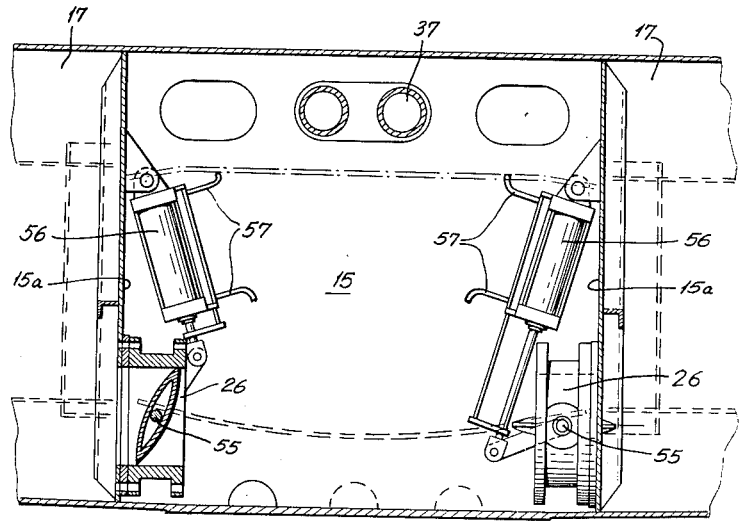
FIG. 5 is an enlarged cross section of the longitudinal trunking shown in FIG. 4 showing the control valves controlling the flow of ballast from the trunking to the adjacent ballast tanks.

In all of the above described systems the valves controlling the flow of ballast fluid or cargo oil to and from the transverse and longitudinal trunking are preferably of the butterfly type similar to the valves 26 shown in detail in FIG. 5. These valves are provided with a stem 55 to which is connected a cylinder and piston device 56 pivotally anchored on the side walls 15a of the trunk 15. Hydraulic fluid conduits 57 connect the cylinder and piston devices 56 with a centrally located control panel 58 which incorporates the necessary controls 59 for remote operation of the valves in well known manner. (See also FIG. 3B.)

Figure 6:
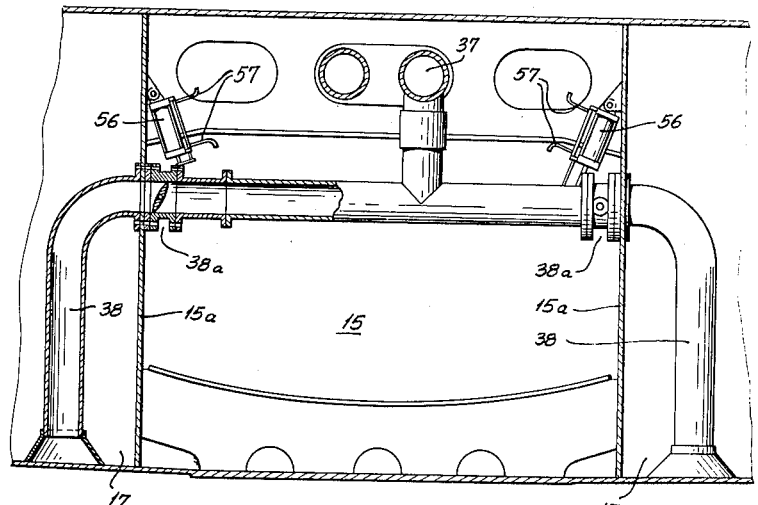
FIG. 6 is an enlarged cross section similar to FIG. 5 but showing the method of stripping the ballast tanks through control valves and piping installed in the longitudinal trunking.

Similarly, the valves 38a in the stripping lines 37, 38 are of the butterfly type as shown in FIG. 6 and are operated by cylinder and piston devices 56 in the manner described above.

In the operation of the above described system of ballasting and deballasting, that shown in FIGS. 3A and 3B will now be described, with the understanding that the piping, cross-connections and valve arrangements associated with the ballast pumps are shown schematically only.

The first operation is to flood the transverse trunk 16 and longitudinal trunk 15 for use as a large volume reservoir of ballast fluid. This is accomplished by opening the appropriate valves 25 and/or 34 thereby permitting flow from the sea suction chests 24 and 33 to transverse trunk 16 and longitudinal trunk 15 and by starting up the pumps 23 and 32. With the trunking flooded, selected valves 26 can be opened by operating the appropriate controls at the central control panel 58, permitting ballast fluid to flow into the selected double bottom compartments 17 and side hopper tanks 18. At the same time, further valves 25a can be opened to permit a flow of ballast fluid through the lines 27 to deck level where selected valves 29 can be opened to flood the wing ballast tanks 19. Additionally, further valves 34a can be opened to permit flooding of the fore peak tank 20.

By controlling the opening and closing of the various valves the trim of the vessel can be controlled rapidly and with a minimum load on the pumps as the ballast fluid will flow immediately from the trunking reservoir into the lowermost tanks and compartments, with the pumps being merely called upon to maintain the trunking reservoir at full capacity. It is only in filling the wing ballast tanks 19 that any appreciable length of piping is required. Therefore the load on the pumps due to friction in the pipes is kept to a minimum. When the selected tanks and compartments are full of ballast fluid, the appropriate valves between them and the trunking or pumps are closed.

In the operation of deballasting it is only necessary to start up ballast pumps 23 and/or ballast pumps 32, after the appropriate valves 25 and 34 have been opened to provide flow of ballast fluid from the trunking and out through the sea suction chests 34 and 33.

To expel the remainder of the ballast fluid from the tanks, stripper pumps 35 are started up and the selected stripper valves 38a are opened. This will evacuate all the interconnected tanks 17, 18 and 19, the tanks 19 being drained by the pipes 38 into the tanks 18. The ballast fluid withdrawn from the tanks 17, 18 and 19 may be returned to the trunking system or be discharged overboard as desired. The evacuation of the tanks 17, 18 and 19 is assisted by compressed air fed to the tanks through the lines 39 and 40.

In the systems shown in FIGS. 7A, 7B and 8 the operation is similar to that described above except that either sea water ballast can be used as in the case of FIGS. 3A and 3B or oil cargo can be used for ballasting purposes. The cross-over connections would be fitted with suitable isolating valves to prevent mixing of seat water with cargo oil.

The embodiments of the invention in which an exclusive property or privilege is claimed are defined as follows:

1. A ballast system for vessels comprising a trunk line section in the vessel extending longitudinally along a substantial portion of the length of the vessel and communicating at least at one end thereof with a transversely extending trunk section, said longitudinal and transverse trunks forming a common fluid reservoir, a plurality of separate ballast tanks arranged at each side of said longitudinally extending trunk line section, the side walls of said longitudinally extending trunk line section being formed at least in large part by substantially upright wall members which separate the interior of said longitudinal trunk line section from the interiors of said separate ballast tanks, valves individually controlling the flow of fluid between the longitudinal trunk line section and each of said separate ballast tanks, said valves being mounted in said substantially upright wall members adjacent the floor of said longitudinal trunk line section and the floors of said separate ballast tanks so as directly to communicate their respective interiors when open, means for opening and closing said valves by remote control, means for discharging fluid from said ballast tanks independently of said trunk lines, said last-mentioned means comprising a main stripping line extending longitudinally through the interior of the trunk line and a plurality of valve branch connections connecting said main stripping line with the lower portions of individual ones of said separate ballast tanks, a stripping pump connected to said main stripping line, a main ballast pump, and means connecting said main ballast pump directly with said transversely extending trunk section.

2. A ballast system for vessels as set forth in claim 1, in which the said ballast tanks at each side of said trunk line include a series of double-bottom tanks and wing tanks with said wing tanks draining into said bottom tanks.

3. A ballast system for vessels as set forth in claim 2, in which the said trunk line is divided longitudinally in parallel sections servicing selective ballast tanks.

References Cited by the Examiner

UNITED STATES PATENTS

| | | | |
|---|---|---|---|
| 1,953,389 | 3/34 | Bolton | 114—74 |
| 2,346,505 | 4/44 | Preuss | 114—74 |
| 2,710,586 | 6/55 | Shelton | 114—74 |
| 2,979,009 | 4/61 | Sorman | 114—74 |

FOREIGN PATENTS

| | | |
|---|---|---|
| 830,598 | 3/60 | Great Britain. |
| 1,225,003 | 2/60 | France. |

FERGUS S. MIDDLETON, *Primary Examiner.*